United States Patent [19]

Keyser et al.

[11] 4,038,422

[45] July 26, 1977

[54] COATED BAKED GOODS

[75] Inventors: William L. Keyser, East Dundee; Walter J. Zielinski, Ingleside, both of Ill.

[73] Assignee: The Quaker Oats Company, Chicago, Ill.

[21] Appl. No.: 623,643

[22] Filed: Oct. 20, 1975

Related U.S. Application Data

[63] Continuation-in-part of Ser. No. 543,435, Jan. 23, 1975, abandoned.

[51] Int. Cl.² .............................................. A23G 3/00
[52] U.S. Cl. .................................... 426/72; 426/585; 426/659; 426/311; 426/94; 426/302
[58] Field of Search .................. 426/607, 659, 72, 73, 426/94, 311, 302, 307, 585

[56] References Cited

U.S. PATENT DOCUMENTS

| 2,970,918 | 2/1961 | Petersen | 426/659 |
|---|---|---|---|
| 2,975,060 | 3/1961 | Best et al. | 426/607 |
| 3,361,568 | 1/1968 | Kidger | 426/313 |
| 3,706,576 | 12/1972 | Caverly et al. | 426/607 |
| 3,767,824 | 10/1973 | Keyser et al. | 426/73 X |
| 3,790,608 | 2/1974 | Caverly et al. | 426/607 X |

OTHER PUBLICATIONS

Bohn, Biscuit and Cracker Production, 1957 American Trade Publishing Co., New York, pp. 171-176.

*Primary Examiner*—Joseph M. Golian
*Attorney, Agent, or Firm*—Charles J. Hunter

[57] ABSTRACT

A coating for coating baked products is disclosed. The amount of fat from the coating which is absorbed by the dough portion of the baked product is significantly reduced without reducing the fat content of the coating. The coating contains specified amounts of vegetable oil or fats, sugar, and nonfat dry milk solids. The amount of nonfat dry milk solids in the coating is unusually high and is of particular importance to the invention. The coating may also be used to add heat sensitive vitamins to a baked food product.

22 Claims, No Drawings

COATED BAKED GOODS

CROSS-REFERENCES TO RELATED APPLICATION

This application is a continuation-in-part of Application Ser. No. 543,435, filed Jan. 23, 1975 and now abandoned.

BACKGROUND OF THE INVENTION

1. Field of the Invention

This invention relates to a coating for coating baked products, e.g. cakes, cookies, etc. wherein the amount of liquefied fat from the coating which is absorbed by the dough portion of the baked product is significantly reduced without reducing the fat content of the coating. This invention also relates to baked products having therein vitamins which are heat sensitive.

2. Description of the Prior Art

Heretofore, it has been virtually impossible to maintain high levels of heat sensitive vitamins in baked products. The reason for this is obvious. The baking temperature required for baking the product normally destroy or render substantially ineffective vitamins which are heat sensitive. Coatings for baked food products normally consist of fats, sugar, and milk solids with possibly an emulsifier added along with the flavoring agent. Normally, baked products which have this type of compound coating added thereto are of inferior quality. The reason for this is that the products have a high fat content which turns liquid when the temperature of the fat is exceeded and is thereafter absorbed by the dough portion of the product resulting in an unacceptable appearance and mouth feel. In the past, this problem has been minimized by increasing the melting point of the fat or oil. However, a waxy mouth feel side effect usually limits the melting point of the coating long before the melting point approaches the upper limits of storage temperatures.

Several processes have been disclosed for preparing coatings for coated baked products. Typical of these are the ones described in U.S. Pat. No. 3,361,568 and in the Biscuit and Cracker Baker Magazine entitled "Biscuit and Cracker Product" by Ralph M. Bohn, published in 1967 by the American Trade Publishing Company of New York and Chicago. Although both of the above-mentioned references teach the use of some of the same ingredients which are used in the coating of the present invention, the amounts of the ingredients differ significantly from the amounts used in the coating of the present invention. Of particular importance is the amount of dry milk solids used in the present invention. The present invention requires the use of at least 25 percent nonfat dry milk solids, whereas, the hard butter coating described in U.S. Pat. No. 3,361,568 only requires from 5 to 17 percent dry milk solids. The crux of this invention resides in the finding that coatings for baked food products can be produced wherein the fat from the coating is not absorbed into the baked product when stored for long periods of time, at temperatures exceeding the melting point of the coating. Neither of the above-mentioned references teach a coating in which dry milk solids are present in an amount of 25 percent or more by weight of the total formulation.

The new and novel process of this invention provides a new and novel product which overcomes each of the disadvantages of the prior art.

SUMMARY OF THE INVENTION

It is an object of this invention to provide a coating for coating baked food products.

It is another object of this invention to provide a process for producing a coating for coating baked food products.

Another object is to prepare coatings for coated bake products which are free of the "waxy" mouth feel, which remain solid at room temperature but melt sharply at body temperature and with a melting range which may be controlled within narrow limits.

Still another object is to prepare coatings for coated baked products in which the fat in the coating will not be substantially absorbed into the baked product when stored over a long period of time at temperatures exceeding the melting point of the coating.

It is still another object of this invention to provide a method for producing a baked food product containing stable, heat-sensitive vitamins.

It is still another object of this invention to provide a baked food product having therein substantial amounts of heat-sensitive vitamins.

The objects of this invention are accomplished by a coating for coating baked products, said coating comprising from about 30 to about 40 percent by weight vegetable oil or fat, from about 10 percent to 40 percent by weight sugar, from about 25 percent to about 50 percent by weight nonfat dry milk solids, and a flavoring agent. This coating may also contain an emulsifier in an amount of up to about 1 percent by weight with the preferred emulsifier being lecithin.

The objects of this invention are further accomplished by a process for producing a coating for coating baked products, said process comprising: admixing from about 30 percent to about 40 percent by weight vegetable oil or fat, from about 10 percent to 40 percent by weight sugar, from about 25 percent to 50 percent by weight nonfat dry milk solids, and a flavoring agent; and heating the mixture while admixing to get uniform blending thereof.

Additionally, the objects of this invention are accomplished by a process for producing a baked food product containing stable, heat-sensitive vitamins, said process comprising: preparing a baked food product; preparing a vitamin containing coating containing heat sensitive vitamins by admixing the vitamins with a coating compound comprising from about 30 percent to about 40 percent by weight vegetable oil or fat, from about 10 percent to 40 percent by weight sugar, from about 25 percent to 50 percent by weight nonfat dry milk solids, and a flavoring agent; and applying the coating to the baked food product to coat a portion thereof. The coating may be applied to the baked product by spraying, spreading or by dipping the baked product into the coating. In the process, which includes the addition of heat-sensitive vitamins, it may be desirable to slightly heat the coating before or during its mixing, but said heating is not to be to a level sufficient to cause heat degradation of the vitamins. If the vitamins are coated with an edible liquefied fatty material as described hereafter, care should be taken not to exceed the melting point of the edible liquefied fatty material.

In another embodiment of this invention the objects of this invention are accomplished by a process wherein the vitamins are partially stabilized against degradation by coating them with an edible liquefied fatty material, said fatty material comprising a saturated aliphatic acid having between 12 and 20 carbon atoms inclusive or a glyceride having the formula:

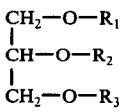

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F. It is preferred in this process that the vitamin material be coated according to the process of admixing from 5 to 50 parts by weight of the heat sensitive vitamins with from 95 to 50 parts by weight of the edible liquified fatty material and with a cooling agent, said cooling agent having a temperature below 32° F., and said cooling agent being admixed in an amount sufficient to solidify the mixture and maintain the mixture solidified throughout the vitamin coating process, with said cooling agent being nontoxic and chemically inert with respect to the vitamins and fatty material; subdividing the total fatty material-vitamin mixture until a major portion thereof passes through a No. 20 U.S. Sieve but has a particle size greater than about 75 microns in diameter; and removing the cooling material therefrom by sublimation or evaporation.

In addition, he objects of this invention are accomplished by a baked food product having stable, heat-sensitive vitamins therein, said food product comprising a baked food product with a coating applied to a portion thereof, said coating comprising heat sensitive vitamins added to a mixture containing from about 30 percent to about 40 percent by weight vegetable oil, from about 10 percent to 40 percent by weight sugar, from about 25 percent to 50 percent by weight nonfat dry milk solids and a flavoring agent.

In still a further embodiment of this invention the baked food product as discussed herein has vitamins which are at least partially stabilized by coating them with a fatty material, said fatty material comprising a saturated aliphatic acid having between 12 and 20 carbon atoms inclusive or a glyceride having the formula:

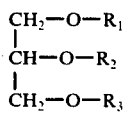

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F. The coating compounds for the baked products of this invention include from about 30 percent to about 40 percent by weight vegetable oil or fat. The oil-like material of this invention is a vegetable fat or oil as animal fats and oils will oxidize too readily under storage conditions. The vegetable oil can be of any of the commonly used vegetable oils of the baking industry except the oil should be a non-lauric acid fat or oil because reaction of water with the lauric acid fats causes a soapy taste.

The coating compositions for use in this invention also include from about 10 percent by weight to 40 percent by weight sugar. The sugar may be any blend of mono, di, tri, or other higher saccharides. For example, the sugar may be dextrose, lactose, sucrose, fructose, maltose, or combinations thereof or any of the higher saccharides present in corn syrup or combinations thereof. The dextrose and lactose may be anhydrous to hydrated in whole or in part.

The coating of this invention also includes from about 25 percent to about 50 percent by weight nonfat dry milk solids. By use herein of the term "nonfat dry milk solids" it is intended to mean that term in its normal usage in the food industry as nonfat dry milk solids are generally defined. The coating cannot have substantially below 25 percent by weight nonfat dry milk solids or else the fat will bleed into the baked product when stored at temperatures above the melting point of the coating, thereby creating the problems sought to be eliminated. Additionally, above about 50 percent by weight nonfat dry milk solids causes the coating to be unacceptable.

The coating compound of this invention also includes a flavoring agent which may be any flavoring agent desired to give the requisite flavor. For instance, it can be vanilla or cocoa liquor or cocoa powder or any other such flavor as is normally used in food products. It must be remembered, however, that the flavoring agent cannot be added in an amount which will substantially increase any of the other ingredients, such as the flavoring agent cannot contain large amounts of fat and be added in such a level as to appreciably increase the fat content of the product. If this occurs, the fat must be reduced to compensate for the fat in the flavoring agent and the fat in the flavoring agent must be taken as a portion of the fat in the total product.

The coating compositions, as herein claimed, may contain an emulsifier in an amount up to about 1 percent by weight. The emulsifier can be any of the well-known emulsifiers used in the food industry so long as it has the approximate emulsification properties of lectithin, i.e., an HLB ration within say about five points on either side of the HLB of lecithin. Lecithin is particularly acceptable for use as the emulsifier herein.

In the process of this invention, the fat, sugar, and nonfat dry milk solids are mixed along with the flavoring agent and emulsifier and heated while mixing to get a uniform blending thereof. The heating should be in an amount sufficient to melt the fat, but not at such a temperature as to cause degradation of the most heat sensitive ingredient therein.

When the process of this invention is one which is utilized to place heat sensitive viatmins in a baked food product, the coating is prepared and the heat sensitive vitamins are added either after the heating is completed or else the heating is only to a degree which will not cause degradation of the vitamins. In other words, when heat sensitive vitamins are added to the coating, the temperature thereof is purposely kept low in order not to weaken the potency of the vitamins or melt the fatty material used to coat and protect the vitamins. After the coating is prepared, it is applied to the baked food product to cause the overall product to have a large amount of stabilized heat sensitive vitamins.

In some instances, the vitamins in a baked food product are particularly susceptible to oxidation when heated or when simply exposed to the conditions found normally in the food product. In such a case, it is particularly desirable to coat the vitamins with an edible liquefied fatty material prior to inclusion in the coating.

Consequently, it has been found particularly desirable to coat the vitamins with a fatty material comprising a saturated aliphatic acid having between 12 and 20 carbon atoms inclusive or a glyceride having the formula:

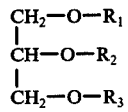

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F.

One particular method that has been found highly acceptable for coating the heat sensitive vitamins is to add from 5 to 50 parts by weight of the heat sensitive vitamins to from 95 to 50 parts by weight of the edible liquified fatty material and then add this mixture to the cooling agent, with said cooling agent being added in the amount sufficient to solidify the mixture and maintain the mixture solidified throughout the vitamin coating process, with the cooling agent being nontoxic and chemically inert with respect to the heat sensitive vitamins and to the fatty material; subdividing the total fatty material-vitamin mixture until a major portion thereof passes through a No. 20 U.S. Sieve but has a particle size greater than about 75 microns, and removing the cooling material therefrom by sublication or evaporation. It has been found that solidified carbon dioxide (dry ice) or liquid nitrogen can be used as the cooling material. It has also been found that equal parts of the fatty material-vitamin mixture and cooling agent are sufficient to solidify the mixture but four times by weight of the amount of cooling agent to liquified fatty material-vitamin mixture is particularly acceptable.

Any of the fatty materials which fall within the conditions herein described are useful in this invention although hydrogenated vegetable oil having the requisite melting point is particularly acceptable as the fatty material of this invention.

DESCRIPTION OF THE PREFERRED EMBODIMENTS

This invention may be more fully defined, but is not limited by the following examples.

EXAMPLE 1

A coating was prepared by admixing 35 percent by weight hydrogenated vegetable oil, 52 percent by weight sucrose, 6 percent by weight nonfat dry milk solids, 6 percent by weight whole milk powder, and 1 percent by weight of equal parts of vanilla flavoring and lectithin. The mixture was uniformily blended, melted, and coated onto a baked food product. After four days of storage alternated between 70° and 118° F. with at least 4 hours at 118° F., the liquefied fat in the coating was almost entirely absorbed into the dough and the product was unacceptable. The product in this example is not in accordance with this invention.

EXAMPLE 2

A coating was prepared by admixing 27.5 percent by weight hydrogenated vegetable oil, 32 percent by weight sugar, 25 percent by weight nonfat dry milk solids, 0.5 percent by weight vanilla and lecithin, and 15 percent by weight cocoa flavoring. The coating was melted and coated onto the baked food product of Example 1. After 4 days of storage alternating between 70° and 118° F. with at least 4 hours at 118° F., some of liquefied fat in the coating was absorbed into the dough of the baked product. After eight days of storage alternating between 70° and 118° F. with at least 4 hours at 118° F., a larger amount of the liquefied fat in the coating was absorbed into the dough of the baked product. However, the total amount of liquefied fat absorbed by the baked product was significantly less than the total amount of liquefied fat absorbed by the baked product of Example 1. The acceptability of the product of this Example is considered borderline.

EXAMPLE 3

A coating was prepared by admixing 35 percent by weight emulsified hydrogenated vegetable oil, 34 percent by weight sucrose, 30 percent by weight nonfat dry milk solids, and 1 percent by weight of equal parts of vanilla flavoring and lecithin. The coating was melted and coated onto the same baked food product of Example 1. After 4 days and 8 days of storage alternating between 70° F. and 118° F. with at least 4 hours at 118° F. only a very small amount of the liquefied fat in the coating appeared to be absorbed into the baked food product and unlike the product of Example 1, this produce is acceptable.

EXAMPLE 4

A coating was prepared by admixing 40.5 percent by weight emulsified hydrogenated vegetable oil, 18.9 percent by weight sugar, 40 percent by weight nonfat dry milk solids, 0.41 percent by weight lecithin, 0.15 percent by weight vanilla, 0.02 percent by weight potassium iodide (3 percent solution), and 0.02 percent by weight vitamin $B_{12}$ (0.1 percent spray dried). The coating was melted and applied to the baked food product of Example 1 and after storage for 4 and 8 days alternating between 70° and 118° F. with at least 4 hours at 118° F., none of the fat appeared to be absorbed into the product. Again, an excellent product was produced.

EXAMPLE 5

Twenty parts by weight vitamin C was mixed with 80 parts by weight hydrogenated vegetable oil having a melting point of 145° F. and one part by weight of this entire mixture was mixed with four parts by weight solidified carbon dioxide. This mixture was then subdivided until it passed through a No. 20 U.S. Sieve but had a particle size above 75 microns. The dry ice was then allowed to sublime from the mixture. The coated vitamin C was substituted for the vitamin $B_{12}$ of the previous example. Again, the product showed no fat absorption into the dough after 4 and 8 days storage at 118° F. and upon analysis, it was found that the vitamin C was substantially of the same strength after the storage as it was prior to storage.

Example 2 constitutes the preferred embodiment of this invention. It may be seen that this invention constitutes a new and novel advance in coatings for baked products. It may also be seen that this invention provides a new and novel process for adding heat sensitive vitamins to baked food products. It may also be seen that this invention for the first time produces a baked product high in heat sensitive vitamins. The products also have an excellent taste and texture especially when compared to past products.

Having fully described this new and unique invention, the following is claimed:

1. A coating for coating baked products, said coating comprising: from about 30 percent to about 40 percent by weight vegetable fat or oil, from about 10 percent to 40 percent by weight sugar, from about 25 percent to about 50 percent by weight non-fat dry milk solids, and a flavoring agent.

2. A coating as in claim 1 which also contains an emulsifier.

3. A coating as in claim 2 wherein the emulsifier is lecithin.

4. A vitamin containing coating for coating baked products, said coating comprising: heat-sensitive vitamins, from about 30 percent to about 40 percent by weight vegetable fat or oil, from about 10 percent to 40 percent sugar, from about 25 percent to about 50 percent by weight non-fat dry milk solids, and a flavoring agent.

5. A coating as in claim 4 which also contains an emulsifier.

6. A coating as in claim 2 wherein the emulsifier is lecithin.

7. A process for producing a coating for coating baked products, said process comprising: admixing from about 30 percent to about 40 percent by weight vegetable oil or fat, from about 10 percent to 40 percent by weight sugar, from about 25 to 50 percent by weight non-fat dry milk solids, and a flavoring agent.

8. A process as in claim 4 wherein up to about 1 percent by weight of an emulsifier is added.

9. A process as in claim 8 wherein the emulsifier is lecithin.

10. A process as in claim 9 which includes heating the mixture while mixing to get uniform blending thereof.

11. A process for producing a vitamin containing coating for coating baked products, said process comprising: admixing heat-sensitive vitamins, from about 30 percent to about 40 percent by weight vegetable oil or fat, from about 10 percent to 40 percent by weight sugar, from about 25 to 50 percent by weight non-fat dry milk solids, and a flavoring agent.

12. A process as in claim 11 wherein lecithin is added.

13. A process as in claim 12 wherein the coating during or before mixing is heated to a temperature below the temperature at which the vitamins degrade.

14. A process as in claim 12 wherein the vitamins are partially stabilized against degradation by coating them with an edible liquified fatty material, said fatty material comprising a saturated aliphatic acid having between 12 and 20 carbon atoms inclusive or a glyceride having the formula:

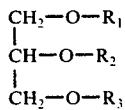

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F.

15. A process as in claim 13 wherein the vitamins are coated according to the process of admixing from 5 to 50 parts by weight of the heat-sensitive vitamins with from 95 to 50 parts by weight of the edible liquified fatty material with a cooling agent, said cooling agent having a temperature below 32° F., and said cooling agent being admixed in an amount sufficient to solidify the mixture and maintain the mixture solidified throughout the vitamin coating process, with said cooling agent being nontoxic and chemically inert with respect to the vitamins and fatty material; subdividing the total fatty material-vitamin mixture until a major portion thereof passes through a No. 20 U.S. Sieve but has a particle size above about 75 microns; and removing the cooling material therefrom by sublimation or evaporation.

16. A process for producing a baked food product containing stabilized heat-sensitive vitamins, said process comprising: preparing a baked food product; preparing a vitamin containing coating containing heat-sensitive vitamins by admixing the vitamins with a coating compound comprising from about 30 percent to about 40 percent by weight vegetable oil or fat, from about 10 percent to 40 percent sugar, from about 25 percent to 50 percent by weight non-fat dry milk solids, and a flavoring agent; applying the coating to the baked food product to coat a portion thereof.

17. A process as in claim 16 wherein the coating during or before mixing is heated to a temperature below the temperature at which the vitamins degrade.

18. A process as in claim 16 wherein the vitamins are partially stabilized against degradation by coating them with an edible liquified fatty material, said fatty material comprising a saturated aliphatic acid having between 12 and 20 carbon atoms inclusive or a glyceride having the formula:

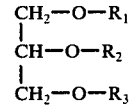

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F.

19. A process as in claim 17 wherein the vitamins are coated according to the process of admixing from 5 to 50 parts by weight of the heat-sensitive vitamins with from 95 to 50 parts by weight of the edible liquified fatty material with a cooling agent, said cooling agent having a temperature below 32° F., and said cooling agent being admixed in an amount sufficient to solidify the mixture and maintain the mixture solidified throughout the vitamin coating process, with said cooling agent being nontoxic and chemically inert with respect to the vitamins and fatty material; subdividing the total fatty material-vitamin mixture until a major portion thereof passes through a No. 20 U.S. Sieve but has a particle size above about 75 microns; and removing the cooling material therefrom by sublimation or evaporation.

20. A baked food product having stable heat-sensitive vitamins therein, said food product comprising a baked food product with a coating applied to a portion thereof, said coating comprising heat sensitive vitamins added to a mixture containing from about 30 to about 40 percent by weight vegetable oil or fat, from about 10 percent to 40 percent by weight sugar, from about 25 percent to 50 percent by weight non-fat dry milk solids, and a flavoring agent.

21. A baked food product as in claim 20 wherein the vitamins are partially stabilized by coating them with a fatty material, said fatty material comprising a saturated aliphatic acid having between 12 and 20 carbon atoms inclusive or a glyceride having the formula:

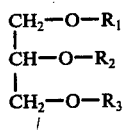

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F.

22. A process as in claim 15 wherein the coating during or before mixing is heated to a temperature below the melting point of the edible liquified fatty material which is coated onto the vitamins.

* * * * *